April 28, 1959  S. RATCLIFFE  2,884,627
RADAR SYSTEMS
Filed May 9, 1955

Stanley Ratcliffe
Inventor
By W.R. Maltby
Attorney

United States Patent Office 2,884,627
Patented Apr. 28, 1959

2,884,627

RADAR SYSTEMS

Stanley Ratcliffe, Malvern, England, assignor to the Minister of Supply in Her Majesty's Government of the United Kingdom of Great Britain and Northern Ireland, London, England Application May 9, 1955, Serial No. 507,015

5 Claims. (Cl. 343—7.5)

This invention relates to radar systems.

In radar systems difficulties are often encountered owing to the fading of signals. For instance it is well-known that, in an automatic system of the lock-follow type, fading can be the cause of failure of the lock-follow.

It is an object of the invention to reduce the effects of fading in radar systems.

It has been found from investigations that when certain targets are changed in aspect relative to a radar system, the signals reflected from these targets and received by the radar receiver change and so cause fading. This is considered to be due to a change in the make-up of constructive and destructive interferences between reflections from incremental parts of the target as the aspect of the target changes.

It can be shown for the simple case of two incremental areas that a change of frequency can turn a destructive interference into a constructive one.

Suppose that in a radar system operating at a wavelength $\lambda$ a reflected signal is due to two areas which differ by an amount $l$ in their distance from the origin of radar system. The two resultant signals at the origin will differ in phase by $4\pi l/\lambda +$ some term independent of $l$. The change in wavelength $\delta\lambda$, which will change the relative phase of the two signals by $\pi$ radians and so turn a destructive interference to a constructive one, is given by:

$$4\pi l/\lambda = 4\pi l/(\lambda + \delta\lambda) + \pi$$

which leads to $$\delta\lambda/\lambda = \lambda/4l \text{ approximately, for } \lambda \gg \delta\lambda \quad (1)$$

where $\delta\lambda/\lambda$ is the fractional change in wavelength (and hence frequency) necessary to turn a signal minimum into a maximum.

In terms of frequency $f$ (1) becomes $\delta f/f = c/4lf$ (since the sign of the change is unimportant)

$$\therefore \delta f = c/4l = 75/l \quad (2)$$

where $\delta f$ is in mc./s., and $l$ is in metres; it will be noted that the frequency shift needed is independent of the operation frequency of the system, provided that this is high.

It can also be shown from statistical considerations and an extension of the above reasoning that, a radar system using it one time effectively more than one frequency can give an increased probability of obtaining a detectable signal in circumstances when fading would appear to be due to target aspect changes.

It has already been proposed on empirical grounds to use two pulse-synchronised transmitters each operating on a different frequency but it has also been appreciated that for a given period in which signals from a target suffer from fading on one frequency and do not suffer on the second frequency the output power at the one frequency is yielding no return for the period of fading as far as that target is concerned and in that period no more than half the power is used effectively.

According to the invention therefore a radar system comprises transmitting means capable for transmitting signals on more than one frequency, receiving means for receiving reflected signals corresponding to the transmitted signals, means for periodically changing the frequency of transmission and reception of the system, and utilisation means for utilizing the received signals.

Conveniently the frequency changing means comprise switching means for switching the frequency between two predetermined values.

The switching means may be arranged to operate continuously without other control; or, it may operate under the control of a circuit sensitive to the amplitude of the received signals whereby the switching means operates continuously when the received signals fade more than a predetermined amount and ceases continuous operation when the received signals recover from the fade.

In an alternative, means may be provided in a radar system for varying the frequency of operation in accordance with received signal amplitude under the control of a circuit sensitive thereto, whereby the frequency is adjusted to optimise the signal amplitude; the amplitude sensitive circuit advantageously incorporates an amplifier having a log-characteristic.

Filter means may be provided to reduce the effect of such disturbances as propeller modulation of the received radar echo pulses and may comprise, for example, a low-pass filter connected in the input to the circuit which is sensitive to the amplitude of the radar signal.

In order to make the invention more clear radar systems in accordance with the invention will now be described by way of example and reference made to the accompanying drawings, in which.

Figure 1:
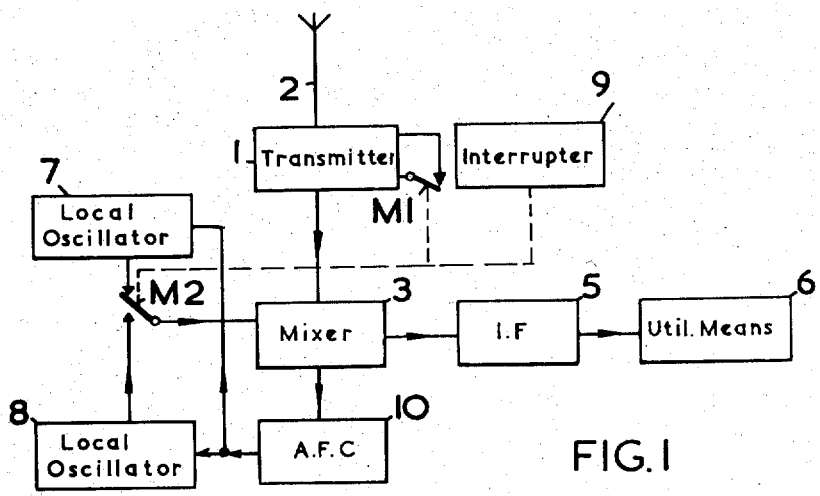
Fig. 1 shows a block diagram of a radar system.

In Fig. 1 a radar system comprises a transmitter 1 which feeds an aerial 2, and a mixer 3 forming part of a superheterodyne receiver. The mixer 3 feeds an intermediate frequency stage 5 and a utilisation means 6 for utilising received echo signals. Two local oscillators 7 and 8 of different frequency feed into the mixer 3 via changeover switching contacts M2 of an interrupter 9. A switching contact M1 of the interrupter 9 controls, in the transmitter 1, a device for changing the frequency of the output of the transmitter to the aerial 2. An A.F.C. circuit 10 is connected between the mixer 3 and the local oscillators 7, and 8. The frequencies of the local oscillators 7 and 8 are related to the transmission frequencies in the manner usual in superheterodyne receivers.

In operation the interrupter drives the switching contacts M1 and M2 in synchronism so that the transmitting and receiving frequencies of the system remain the same and change between two predetermined values in synchronism.

The two values of frequency are determined, according to the principles discussed previously in relation to the known echoing characteristics of a target from which it is desired to receive echos, or empirically from a series of trial runs. The effect is then that, subject to the now obvious limitations connected with the geometry of a target, the probability of obtaining a useful signal in the utilisation means is increased.

Figure 2:
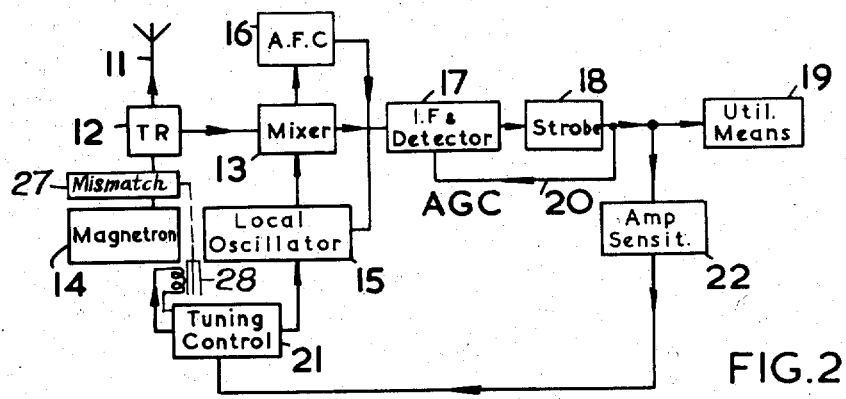
Fig. 2 shows a block diagram of a second radar system.

In Fig. 2 a radar system comprises an aerial 11 and TR (Transmit-Receive) system 12 fed from a mixer 13 and a magnetron valve 14. A local oscillator 15 feeds the mixer 13 and an A.F.C. circuit 16 is connected between the mixer 13 and the local oscillator 15. An IF and detector circuit 17 is fed from the mixer 13 and the resulting output signals are fed via a strobe unit 18 to a utilisation means 19 which in the present example can be taken to be of the type used in lock-follow systems. Automatic gain control is fed back from the output of the strobe unit 18 to the IF and detector unit 17 over a lead 20.

A tuning control 21 is provided which changes the frequencies of the magnetron valve 14 and the local oscillator 15, simultaneously maintaining a predetermined relation between them; the A.F.C. circuit 16 makes good any imperfections in the control 21 which would cause the magnetron and local oscillator frequencies to depart from their predetermined relation.

The tuning control 21 is controlled by an amplitude sensitive means 22 so that the radar operation frequency is switched at a frequency of 10 c./s. between two frequencies when the amplitude of the received pulse signals from the strobe circuit 18 falls below a given value. When the amplitude of the pulse signals from the circuit 18 recovers the switching stops until the signals fall again.

The result is that the mean level of the radar signals fed to the utilisation means 19 is increased and the likelihood of a signal disappearing for long periods is reduced.

In the arrangement of Fig. 2 the two operation frequencies between which switching takes place are arranged to be such that, for signals from a given target, fading is unlikely to take place on both at the same time. Of course, this does not necessarily determine two unique frequencies for a given target; the mean aspect of the target will affect the choice of frequencies. The choice of two frequencies is thus made bearing in mind the expected path of a target—which determines what may be termed a mean aspect—as well as its principal dimensions as they come into the line of sight of the radar. The results of research into the characteristics of aircraft echoing areas prove valuable in making such a choice.

The operation frequencies of the system are determined in the present example by the use of an electromagnetically operated mismatch unit 27 in the output waveguide run of the magnetron valve. This pulls the magnetron frequency by 11 mc./s. which gives a useful advantage when receiving radar signals from, say, a small boat or large aeroplane.

This mismatch unit consists of a section of slotted waveguide in the magnetron output waveguide run. A movable carriage is carried on the waveguide and itself carries two probes. One of the probes is fixed to project through the slot of the slotted waveguide and introduces a mismatch corresponding to a voltage standing wave ratio (V.S.W.R.) of 0.6:1. The other of the probes is arranged to move into and out of the waveguide and is spaced a quarter wavelength along the waveguide from the fixed probe. An electromagnet 28 controls the insertion and withdrawal from the guide of the movable probe. The movable probe, when inserted into the waveguide reverses the phase of the mismatch due to the fixed probe whilst leaving the V.S.W.R. approximately the same. The position of the mismatch unit along the guide is adjusted by means of the movable carriage until the transmitted power is the same for both positions of the movable probe.

Figure 3:
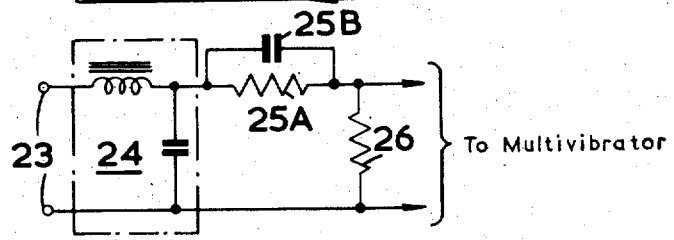
Fig. 3 shows a shaping circuit used in the system of Fig. 2.

A multivibrator provides the current for operating the electromagnet at a frequency of 10 c./s. and forms part of the amplitude sensitive means 22. Also a shaping circuit is provided in the amplitude sensitive means 22 to receive the pulses at the pulse recurrence frequency from the strobe circuit 18 and to provide suitable signals for triggering the multivibrator. The shaping circuit which has a time constant of 1/10th sec. is shown in Fig. 3. The multivibrator is arranged so that it triggers when the output of the shaping circuit falls below a quarter of its mean value.

The shaping circuit consists of a low-pass filter 24 feeding to an RC combination 25 A, B, of 1/10 sec. time constant. The output of the time-constant combination 25 is taken across a resistor 26 to the multivibrator (not shown). The input to the shaping circuit is taken at terminals 23 from the strobe circuit 18.

In operation the multivibrator is quiescent until the output of the shaping circuit falls below a quarter of its mean value. When this occurs the multivibrator commences firing and effects operation of the electromagnet controlling the movable probe, at a frequency of 10 c./s. The transmission frequency is thus switched between two values 11 m.c./s. apart at 10 c./s.

The time of movement of the movable probe is about 10 ms. in the typical example; the time of response of the A.F.C. circuit 16 to follow the transmitter frequency is of the same order. The low-pass filter 24 serves to reduce the effect of disturbances such as propeller modulation for example.

In an alternative arrangement, the basic arrangement of Fig. 2 is used with the tuning control 21 able to provide smooth variation of the frequency of operation; and the amplitude sensitive means 22 controls the operation of the tuning control 21 in accordance with the variation of amplitude of the detected signal. In operation the frequency then varies so as to optimise the received signal amplitude. The amplitude sensitive circuit preferably incorporates an amplifier to give a logarithmic characteristic to the circuit.

I claim:

1. A radar system comprising transmitting means capable of transmitting pulse signals on more than one frequency, receiving means for receiving echo signals corresponding to the transmitted signals, frequency adjustment means for adjusting the frequency of transmission and reception of the system, utilization means for utilizing the received signals and control means sensitive to the amplitude of the received signals for controlling the frequency adjustment means, whereby the signal amplitude is optimised.

2. A radar system as claimed in claim 1, wherein the frequency adjustment means comprises switching means for switching the frequency between two predetermined values.

3. A radar system as claimed in claim 2, wherein the switching means is adapted to operate continuously and the control means is adapted to inhibit continuous operation of the switching means when the amplitude of the received signal is above a given value, whereby the frequency is switched between the two predetermined values when the received signal fades below the given value of amplitude.

4. A radar system as claimed in claim 3, wherein the receiving means comprises a superheterodyne receiver and the switching means are adapted to switch the frequency of the local oscillator of the receiver between two predetermined values corresponding to the predetermined values of the system frequency.

5. A radar system as claimed in claim 4, wherein the transmitting means comprise a magnetron valve and an associated output circuit, and the switching means are adapted to switch into and out of operation a mismatch in the output circuit whereby the transmitting frequency switches between two values.

References Cited in the file of this patent

UNITED STATES PATENTS

| 2,406,316 | Blumlein et al. | Aug. 27, 1946 |
| 2,444,388 | De Vries | June 29, 1948 |
| 2,469,875 | Fyler | May 10, 1949 |
| 2,522,367 | Guanella | Sept. 12, 1950 |
| 2,542,182 | Crump | Feb. 20, 1951 |
| 2,676,317 | Purington | Apr. 20, 1954 |